Patented Jan. 12, 1954

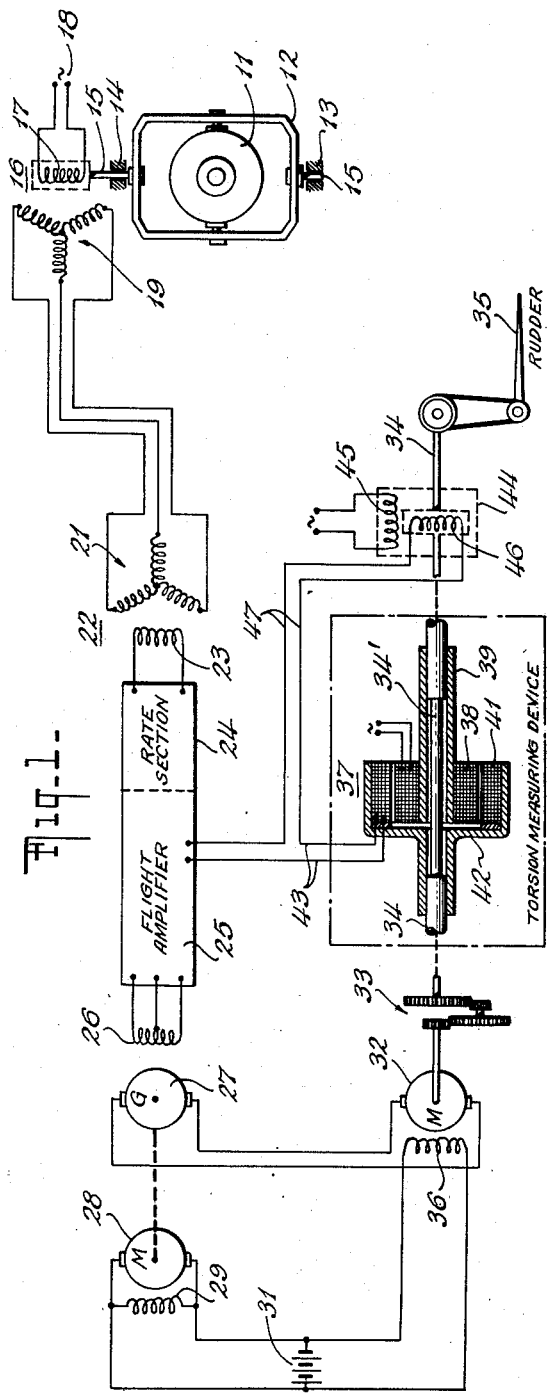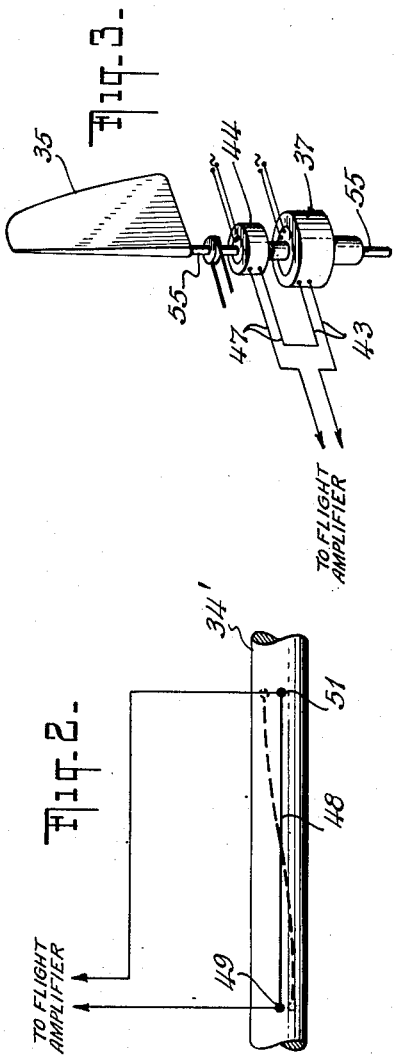

2,666,177

UNITED STATES PATENT OFFICE 2,666,177

SERVOMOTOR SYSTEM HAVING DIFFERENTIAL TORQUE DISPLACEMENT FEEDBACK

Richard S. Brannin, Jr., East Williston, and Percy Halpert, Hempstead, N. Y., assignors to The Sperry Corporation, a corporation of Delaware Application April 1, 1949, Serial No. 84,938

7 Claims. (Cl. 318—489)

The present invention relates, generally, to transmission systems of the type usually employed in automatic flight control apparatus to cause control surface motion in response to signals from an error signal source; i. e., a means for detecting a deviation of the craft from its desired attitude (by which term we also include heading) and producing therefrom an error signal generally proportional to the deviation.

More particularly, the invention concerns the repeat-back signal that is provided in the control surface-servomotor loop of automatic flight control apparatus, or in other transmission systems wherein the servomotor is followed by the craft, or other load, after a time delay. Such action occurs, for example, when an aircraft responds rather slowly to action of the rudder servomotor and in systems of this type it is common to introduce a repeat-back signal to counter-balance the correction error signal to make the surface deflection proportional to the error signal. This repeat-back signal is active during the period that the craft approaches the desired flight path as the corrective movement of the control surface is being made. The optimum mode of operation of the control surfaces of a dirigible craft, in order that so-called deadbeat control can be obtained, has been found to vary considerably over the range of air speeds that the craft will encounter in flight. At low air speeds, as in take-off and landing, the control surface deflections per degree of airplane error from a predetermined path must be relatively large and the resisting forces due to air load on the control surface sought to be controlled are correspondingly small. On the other hand, at higher speeds, the control surface deflections for a given aircraft error should be much smaller, as the air load forces on the control surfaces have been increased in proportion to the square of the indicated air speed. Because of these performance characteristics, it has been found most difficult to properly match the servomotors employed for control surface actuations to the airplane control surfaces in a manner that would provide optimum control of the aircraft over the full range of air speeds encountered.

In copending application, now Patent No. 2,511,846 of Percy Halpert (one of applicants herein) entitled "Automatic Pilot Follow-Up Control," dated June 20, 1950 (of which the present application is a continuation-in-part) it was proposed to alter the repeat-back signal in accordance with a function of the air speed of the craft. In this application, the repeat-back signal comprised either a positional repeat-back signal in which the signal employed was proportional to the displacement of the control surface (which displacement would be also proportional to the output position of the servomotor serving that control surface) or a repeat-back signal proportional to the torque expended in displacing the control surface. By making either of these repeat-back signals vary in accordance with a function of craft air speed an approach to a solution of the aforementioned problem was achieved. However, it has been found that optimum control cannot be obtained from one or the other of these repeat-back signals but that rather such optimum control is obtainable through the use of a differential torque-displacement repeat-back signal in the control surface-servo loop. Thus, by associating the output member of the servomotor with both torque and displacement pickoffs, when a control signal is introduced into a servomotor, the servo will drive until the sum of the torque and displacement signals are substantially equal to the control signal. In this manner, the control surface encounters little air load at low air speeds and its motion as a function of airplane error is determined largely by the displacement repeat-back signal which can be adjusted to give the large deflections required for tight control. On the other hand, at high air speeds the control surface encounters large air loads at very small deflections and its motion for a given control signal is determined largely by the torque repeat-back signal which can be adjusted to give the required moments for tight control.

Therefore, a primary object of the present invention is to provide a transmission system of the type described having improved performance characteristics in its servomotor-control surface loop.

A further object is to provide a transmission circuit with a feed-back voltage that would give small control surface movements at high air speeds and large control surface movements at low air speeds.

A further object is to provide a system that will produce up to full servomotor torque to overcome friction in the control system for very small errors, decreasing the friction dead spot to a negligible amount but still retaining all the advantages of a torque feed-back transmission system.

A further object is to provide a transmission system incorporating the advantages obtainable from both, force follow-up and positional follow-up feed-back circuits.

Further objects and advantages of the present invention will become apparent from the following specification and drawing, in which Fig. 1 of the drawing illustrates, in schematic form, a transmission apparatus incorporating features of the present invention; and Fig. 2 illustrates the details of an alternative torque measuring device for the corresponding element of Fig. 1.

Fig. 3 illustrates a preferred position of the feed-back signal generating devices.

Referring now to Fig. 1 of the drawing, a position or attitude maintaining device such as a directional gyro 11 is illustrated as mounted on the gimbal 12 in a craft, a section of which is illustrated in section at 13 and 14, the gyro being free to rotate about the axis defined by the vertical shaft 15—15. A conventional pick-off in the form of a selsyn 16 may be provided to detect motion of the gyro about the axis 15—15 and includes the rotor 17 energized by power source 18, and stator 19. This magnetic field created in the stator 19 will be transmitted to the remotely located stator 21 of selsyn 22 and will induce in the rotor 23 a signal voltage proportional to the extent of misalignment between the rotor 17 and the rotor 23. This signal voltage may be employed as a control voltage and is connected to a rate section 24 of flight amplifier 25 where it is amplified to an extent that it becomes usable for motor control purposes. The amplified output from the amplifier 25 is connected to the field winding 26 of generator 27. In this instance, the control signal is utilized in the well known Ward-Leonard arrangement and the generator 27 is driven in the rotation by the motor 28 which has its field 29 energized by the power source 31. The output from the generator 27 is supplied to energize the armature of the second servomotor 32 which in this embodiment serves as the prime mover for displacing the rudder 35 through the reduction gearing 33 and shaft 34. The field current for the servomotor 32 is supplied in conventional manner by the power source 31 which is connected across the field 36.

In order to obtain a signal voltage that is proportional to the torque exerted by the shaft 34 in displacing the rudder 35, a signal generating device 37 in the form of a selsyn motor has been provided having an energized field 38 secured by the sleeve 39 to the load end of the shaft 34 and having a field winding 41 mounted on a sleeve 43 secured to the driving end of the shaft 34. A signal output will be produced in the line 43 that is proportional to the torsion applied to the shaft by the servomotor. This signal will, therefore, be proportional to the torque exerted by the servomotor 32 in causing a displacement or a rudder 35 or other control surface.

A second feed-back signal is provided that is proportional to the displacement of the rudder 35 from a normal position, and the second feedback signal may be generated by a signal generating device 44 which may be of the conventional selsyn type having an energized stator 45 and a rotor 46 secured to the shaft 34 to be positioned by it. A signal proportional to that displacement will be transmitted by the lines 47 which, when combined with the signal proportional to the torsion in the shaft, as reflected by the signal on the line 43, may be applied to the flight amplifier 25 as a feed-back signal in a manner opposing the original control signal from the reference device 11.

An alternative manner of producing a signal that is proportional to the torque of the shaft 34' is illustrated in Fig. 2 wherein a resistance wire 48 is secured to the shaft 34' and extends between the points 49 and 51. The wire 48 is affixed to the shaft 34' throughout its length between two points 49, 51, and upon the shaft's experiencing a twisting motion, the resistance of the wire 48 will vary in accordance with that twisting motion. As such twisting motion reflects the torque that is applied to the rudder 35, the variation in the resistance of the wire 48 will likewise be a measure of the torque. This type of torsion measuring device is more fully described in U. S. patent to A. C. Ruge, No. 2,334,843, dated November 23, 1943 and entitled "A Strain Gage With Thermo Current Control." The torsion measuring device illustrated in Fig. 1 is more fully described in the aforementioned copending U. S. application No. 485,586 of Halpert. However, many other devices for measuring either the torque exerted on the rudder or the displacement of the rudder are well known in the art.

In order to minimize the undesirable effects of backlash in the system between the rudder 35 and the servomotor 32, for certain installations, it may be preferable to mount the torsional measuring device 37 and the displacement signal generating means 44 directly on the shaft 55 that is secured to the rudder 35. In this manner, the displacement responsive signal and the torque responsive signal are dependent only upon the actual displacement of the rudder and upon the torque applied thereto, and are free from errors that may be entered as a result of the elasticity of the system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus, while our invention has been described as particularly relating to the control of the heading of an aircraft, it is obviously equally applicable to the control of the craft's attitude about any one or all of its three primary axes, i. e., control of heading, pitch or roll.

What is claimed is:

1. In a control system for dirigible craft having a movable control surface, motor means operatively connected to said surface, means providing an error signal proportional to deviation of the craft from its normal attitude, means producing a second signal proportional to the torque exerted by said motor in displacing said control surface, means for producing a third signal proportional to the displacement of said control surface, said second and third signals being connected to oppose said first signal, and motive means actuated by said combined signals for moving said surface.

2. A follow-up control for automatic pilots having a servomotor, comprising primary signal means for operating said motor, means for producing a second signal in accordance with a function of the torque output of said motor, means for producing a third signal in accordance with a function of the displacement of said motor from normal, means for combining said second and third signals, and means for feeding said combination as an input to said motor in opposition to said primary signal.

3. A follow-up control for automatic pilots having a motor, comprising signal means for operating said motor, means for producing a signal in accordance with the torque output of said motor, means for producing a signal in accordance with the displacement of said motor from normal, and means for feeding said latter two signals to said motor in opposition to the signal of said operating means.

4. A control system comprising a control device, a servomotor and elastic link interconnecting said servomotor and a load to be actuated from said device, means responsive to the relative movement of said control device for producing a first control signal voltage, means responsive to deformation of said elastic link for producing a second control voltage, means responsive to movement of said actuated load from its normal position for producing a third control voltage, means for algebraically adding said second and third control voltages to produce a resultant voltage, and means combining said resultant voltage in a degenerative manner with said control voltage to actuate said servomotor.

5. In a control system wherein a controlled member is positioned by a servomotor in response to an error signal, a feed-back loop for the servomotor including means generating a countersignal proportional to torque exerted on the controlled member, and means generating a further countersignal proportional to the displacement of the controlled member as it is moved by said servomotor under the influence of the aforesaid combined signals.

6. In a control system for a craft having a controlled member positioned by a servomotor in response to an error signal that is proportional to a departure of the craft from a predetermined attitude, a feed-back loop for the servomotor including means generating a signal proportional to the torque exerted on the controlled member, and means generating a signal proportional to the displacement of the controlled member, said torque signal and said displacement signal being connected to oppose said error signal, whereby said error signal is effectively eliminated as the craft reaches the described attitude.

7. In a control system for a craft having a directional reference means and means for generating a primary control signal in accordance with departure of a craft from the direction established by said directional reference means, a servomotor connected to position a craft control surface member in response to said primary signal, means generating a signal proportional to the displacement of the controlled member, means generating a signal proportional to the torque of the controlled member, said last two signals being connected to wipe out said primary signal as the craft approaches the direction established by said directional reference means.

RICHARD S. BRANNIN, JR.
PERCY HALPERT.

References Cited in the file of this patent

UNITED STATES PATENTS

| Number | Name | Date |
|---|---|---|
| 2,232,982 | Tank | Feb. 25, 1941 |
| 2,330,569 | Esnault-Pelterie | Sept. 28, 1943 |
| 2,387,795 | Isserstedt | Oct. 30, 1945 |
| 2,411,139 | Roy et al. | Nov. 12, 1946 |
| 2,451,263 | Webb | Oct. 12, 1948 |
| 2,475,484 | De Nise | July 5, 1949 |
| 2,511,846 | Halpert | June 20, 1950 |